J. S. BUTTERFIELD.
Harvester.
No. 2,452. Reissued Jan'y 15, 1867.
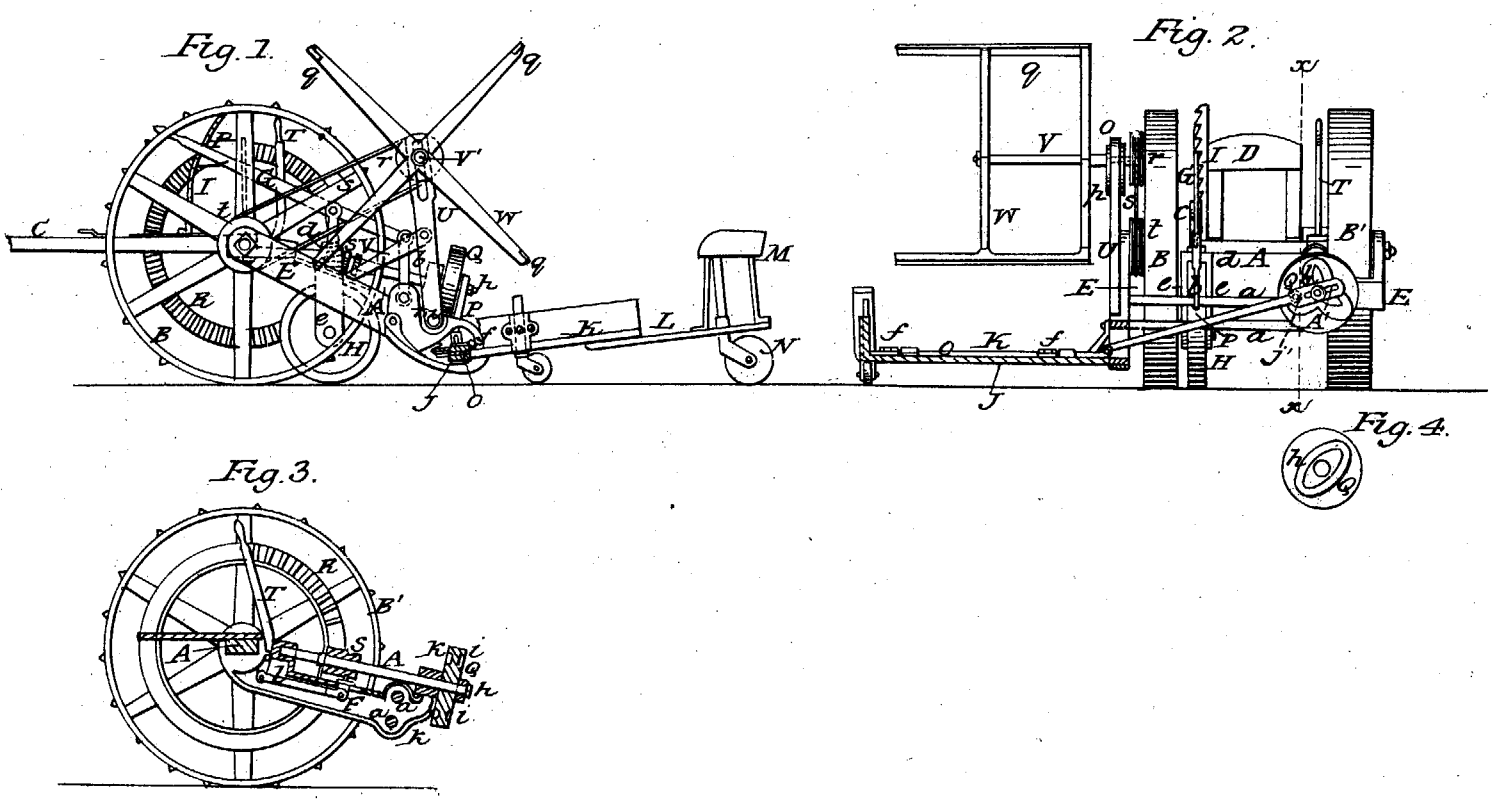
N. PETERS, Photo-Lithographer, Washington, D. C.

UNITED STATES PATENT OFFICE.

ANDREW J. HOLMAN, OF PHILADELPHIA, PENNSYLVANIA, ASSIGNEE OF J. S. BUTTERFIELD.

IMPROVEMENT IN HARVESTERS.

Specification forming part of Letters Patent No. 19,483, dated March 2, 1858; Reissue No. 2,452, dated January 15, 1867.

*To all whom it may concern:*

Be it known that I, J. S. BUTTERFIELD, of the city of Philadelphia, and State of Pennsylvania, have invented certain new and useful Improvements in Reaping and Mowing Machines; and I do hereby declare that the following is a full, clear, and exact description of this branch of my invention, reference being had to the annexed drawings, making a part of this specification, in which—

Figure 1 is a side view of a reaper with my improvement attached. Fig. 2 is a rear view of the same. Fig. 3 is a transverse vertical section of the same, taken in the line *x x*, Fig. 2. Fig. 4 is a detached view of one side of the cam which drives the sickle or cutters.

Similar letters of reference indicate like parts of the machine in all the figures.

The nature of the invention consists in arranging a lifting device, so that the driver, when in his seat, can raise or lower the cutting apparatus of said machines at pleasure; also in a reversible cam-wheel for increasing and diminishing the number of vibrations of the cutters.

To accomplish these results I provide, first, a shaft or axle, A, on which are mounted wheels B B′, so as to turn freely thereon. The draft-pole C is connected to the axle A. D is the seat for the driver, which is placed between the wheels, and located nearly over the axle. To each end of the axle, outside of the wheels, a bar, E, is attached, and at the inner side of the wheel B a bar, F, is attached. These bars E E F are placed loosely on the axle, so that their lower or back ends may be raised or lowered without effecting either the axle A, the wheels B B′, or the driver's seat. The lower or back ends of the bars E E F are connected by rods *a a*, one of which is connected by a link, *b*, to a lever, G, which has its fulcrum at C in the upper part of a small upright, which is attached to a bar, *d*, projecting back a certain distance at right angles from the axle A, and having two pendants, *e e*, attached to its outer end, between which the wheel H is fitted to turn on an axle. The front end of the lever G traverses over a rack, I, at one side of the seat D, and the front end of said lever may be retained at any desired point by placing it under the proper tooth of rack I. To the innermost bar E the finger-bar J is firmly attached by one of its ends. The finger-bar and cutting apparatus, when thus connected, project laterally from the main frame.

When used for reaping, a platform, K, is attached to the finger-bar J, by hinges *f f*. To the back part of the platform K a projecting board or bar, L, is attached, on which the raker's or attendant's seat, M, is placed, and underneath which a caster-wheel, N, is placed, said wheel supporting the back part of the platform, as shown clearly in Fig. 1. The sickle-bar O is placed on the finger-bar J, and supported in the usual manner—the inner end of the sickle-bar is pivoted to one end of a connecting-rod P, the opposite end of which is slotted longitudinally for a certain distance, and is fitted on the back end of a shaft, A′, which is placed on the lower end of the outermost bar E, and is secured thereon by a nut, *h*. On the shaft A′ a circular disk, Q, is placed, said disk being at the slotted end of the rod P. The disk Q is a cam, and in one side a serpentine groove, *i*, is made. This groove may be described as being formed of three grooves of parabolic form, united at their inner ends, so as to radiate at equal distances from the center of the disk Q. In this groove *i* a friction roller or pin, *j*, which is attached to the rod P, fits. On the opposite side of the disk Q an oval or elliptical groove, *k*, is made, as shown clearly in Fig. 4.

When the groove *i* of the disk Q is used in operating the machine three vibrations of the cutter are obtained to each revolution of the disk; and in using the groove *k* two are obtained.

By this arrangement a higher speed of cutters may be produced for mowing grass, and a lower for reaping grain. To the inner side of the wheel B′, and concentrically with it, a bevel annular toothed rim, R, is attached, and revolves with it, and on the upper end of the shaft A′ a sliding bevel-pinion, S, is placed, said pinion being connected by a fork-piece and bar, *l*, with the lower end of a lever, T, as shown clearly in Fig. 3. To the innermost bar E a post or bar, U, is attached at its lower end by a pivot-bolt, *m*, so that it can be inclined more or less, as required. This post has a brace or support, V, pivoted to it, as shown at *n*. The lower end of this is fitted to take into either of a series of notches in the bar E. On this bar or post U the reel is mounted by means of adjustable devices, by which it can be raised up or lowered down upon the post, and retained at any point thereon desired. Motion is imparted to the reel from the pulley *t* on the hub of the wheel B by a belt, *s*, passing around it and pulley *r* on shaft V′.

In operation the machine is moved forward by a team attached to the draft-pole, a rotary motion being imparted to the supporting-wheels, which, through the train of gearing, give a reciprocating motion to the cutters which sever the crop, the cutting apparatus being free to rise and fall as it passes over the ground independent of the up and down movements of the supporting-wheels, and without influencing the driver's seat, and the driver can, by means of that lever, raise the cutting apparatus to pass obstructions.

Having described my invention, so far as is required for a full understanding of this branch of it, those parts relating to another branch thereof will be described in another and separate application, and are herein omitted.

What I claim as new, and desire to secure by Letters Patent, is—

1. The driver's seat D, supported as described, lever G, and wheel H, in combination with the main frame and cutting apparatus, substantially as described.

2. The reversible cam Q, constructed as and for the purposes set forth.

J. S. BUTTERFIELD.

In presence of—
ANDREW J. HOLMAN,
J. B. BUTTERFIELD.